(12) United States Patent
Haviland

(10) Patent No.: US 6,811,188 B2
(45) Date of Patent: Nov. 2, 2004

(54) FLUID DELIVERY SYSTEMS

(75) Inventor: Geoffrey Haviland, Knoxfield (AU)

(73) Assignee: Anaid Nominees Pty Ltd., Knoxfield (AU)

( * ) Notice: Subject to any disclaimer, the term of this patent is extended or adjusted under 35 U.S.C. 154(b) by 0 days.

(21) Appl. No.: 10/344,050

(22) PCT Filed: Aug. 8, 2001

(86) PCT No.: PCT/AU01/00968
§ 371 (c)(1),
(2), (4) Date: Sep. 22, 2003

(87) PCT Pub. No.: WO02/12771
PCT Pub. Date: Feb. 14, 2002

(65) Prior Publication Data
US 2004/0051312 A1 Mar. 18, 2004

(30) Foreign Application Priority Data
Aug. 8, 2000 (AU) .............................................. PQ9266

(51) Int. Cl.⁷ ............................ F16L 27/00; B05B 15/08
(52) U.S. Cl. ...................... 285/272; 169/24; 239/587.1; 285/281; 285/276
(58) Field of Search .............................. 285/121.5, 272, 285/275, 276, 277, 281, 98; 169/24, 25; 239/587.1, 587.5

(56) References Cited

U.S. PATENT DOCUMENTS

| | | | |
|---|---|---|---|
| 2,729,296 A | * | 1/1956 | Gurney ......................... 169/25 |
| 3,106,247 A | * | 10/1963 | Lacks et al. ................... 169/25 |
| 4,535,846 A | * | 8/1985 | Gagliardo et al. ............. 169/25 |
| 4,674,686 A | * | 6/1987 | Trapp .......................... 239/279 |
| 4,949,794 A | * | 8/1990 | Petit et al. ...................... 169/52 |
| 5,395,141 A | * | 3/1995 | Kakuske ....................... 285/281 |
| 5,570,908 A | * | 11/1996 | Merritt ......................... 285/14 |
| 5,617,879 A | * | 4/1997 | Kubala ......................... 285/95 |
| 6,053,539 A | * | 4/2000 | Bravo ......................... 285/276 |
| 6,305,620 B1 | * | 10/2001 | Marchese ................. 239/587.1 |
| 6,308,610 B1 | * | 10/2001 | Deichmann et al. ....... 89/40.01 |
| 6,386,595 B1 | * | 5/2002 | Peppel ........................ 285/281 |

FOREIGN PATENT DOCUMENTS

DE 19852253 * 5/2000

* cited by examiner

Primary Examiner—Eric K. Nicholson
(74) Attorney, Agent, or Firm—Dorsey & Whitney LLP

(57) ABSTRACT

A bearing assembly for relatively moveable pipe sections in a fluid delivery system, said assembly comprising a main body (12) adapted to be connected to one end of one pipe section, the main body having in a generally radially extending annular face, a coaxial seat (16), to receive a first, generally annular bearing member (17), and a coaxial groove (18) to receive an annular seal member (19), an annular center swivel section (21) adapted to be connected to one end of a second pipe section and having on one generally radially extending face, a coaxial seat (22) to engage said first bearing member and having a second coaxial seat (23) on an opposed generally radially extending face to receive a second annular bearing member (24), said swivel section including an annular, axially extending boss (28) extending away from said main body with the opposed generally radially extending face extending radially outwardly from said boss, and a bearing end cap (26) adapted to engage around said second pipe section and be fastened to said main body sandwiching said swivel section and bearing members, said end cap having a seat (35) for said second bearing member, and a second seal member (31) disposed between said end cap and said swivel section.

15 Claims, 3 Drawing Sheets

FLUID DELIVERY SYSTEMS

FIELD OF THE INVENTION

This invention relates to improvements in fluid delivery systems and relates particularly to improvements in such systems which may be used for firefighting purposes, dust laying in mines and other environments, agricultural applications, industrial cleaning and other applications.

While the invention is suitable for any of the applications referred to above, and others, it will be described herein in relation to its application to firefighting. It will be appreciated, however, that the invention is not so limited and aspects of the invention which may need to be modified for its application in other areas will be apparent to those skilled in the art.

DESCRIPTION OF THE PRIOR ART

Water cannon used in firefighting, and in other applications, may be mounted at any appropriate location including on firefighting vehicles. Thus, it is known to mount water cannon on the cabins of firefighting vehicles, such cannons being remotely controlled from within the vehicle cabin. Generally, the cannon is mounted so that the director nozzle is movable both in a vertical and horizontal plane to direct fluid issuing from the nozzle in the desired direction. To facilitate such movement, parts of the water cannon assembly must be moveable relative to each other.

In one particular form of water cannon, the cannon structure is formed of pipe work which is adapted to be mounted in the desired location, such as on a vehicle cabin, the pipe work being connected to a supply of fluid, and the pipe work being relatively moveable so that a nozzle on its end may be directed in an appropriate, desired direction. With this arrangement, the movement of parts of the pipe work relative to each other requires the use of one or more fluid tight bearings.

Such fluid type bearings may involve the use of radially extending bearing surfaces, which may incorporate needle, roller or ball bearings, and axially extending sealing surfaces which incorporate a sealing medium, such as one or more O-rings or other sealing material acting between relatively movable, radially spaced, axially extending cylindrical surfaces. Such known bearings provide minimum stability and support for equipment attached thereto.

It is therefore desirable to provide an improved water delivery system incorporating a modified form of bearing connecting relatively moveable pipe sections.

It is also desirable to provide an improved bearing assembly for relatively movable pipe sections which is relatively simple in construction, is rugged and durable in use and is easily maintained.

It is also desirable to provide an improved bearing assembly for relatively movable pipe sections in a fluid delivery system which incorporates driving means for relatively moving one of the pipe sections.

It is also necessary that movement of the nozzle be effected by an appropriate power source. It has been known to utilise air compressors fitted to firefighting vehicles to provide pneumatic control systems for the water cannon. Alternatively, other known systems use the existing vehicle hydraulic system to obtain a supply of hydraulic power for operation of the water cannon.

However, the use of the vehicle hydraulics in a water cannon system has certain inherent disadvantages including potential contamination to the hydraulic fluid in the vehicle hydraulic system, constant oil flow and pressure through that system which may shorten the life of components, relatively complicated "set up" in providing the necessary hydraulic lines and connectors, and significant vehicle down time when water cannon servicing needs to be performed.

It is therefore desirable to provide an improved water delivery system which obviates some of the disadvantages of the systems currently known and available.

It is also desirable to provide an improved fluid delivery system which is versatile, may be fitted in any appropriate location, including on vehicles and the like, does not require the use of existing hydraulic or pneumatic lines, and is able to be retrofitted, where necessary.

SUMMARY OF THE INVENTION

According to one aspect of the present invention there is provided a bearing assembly for relatively moveable pipe sections in a fluid delivery system, said assembly comprising a main body adapted to be connected to one end of one pipe section, the main body having a coaxial seat to receive a first annular bearing member, and a coaxial groove to receive an annular seal member, an annular center swivel section having on one radial face a coaxial seat to engage said first bearing member and having a similar coaxial seat on an opposed radial face to receive a second annular bearing member, said swivel section including an annular, axially extending boss extending away from said main body, said boss being adapted to be connected to one end of a second pipe section, and a bearing end cap adapted to engage around said second pipe section and be fastened to said main body sandwiching said swivel section and bearing members, said end cap having a seat for said second bearing member, and a second annular seal member disposed between said end cap and said swivel section.

In a preferred form of the invention, the center swivel boss extends through the opening in the end cap and is closely spaced therefrom. The boss provides rigidity for the center swivel as well as providing for the securement of the second pipe section.

In one form of the invention, the main body is formed on its outer surface with gear teeth by which the body and its associated first pipe section is able to be rotated about the axis of the bearing relative to the swivel section and the second pipe section.

In a preferred form of the invention, the end cap is secured to the main body by means of axially extending bolts. The main body may be secured to the first pipe section by welding or the like or by use of a screw thread formed in the main body and on the end of the pipe section. Locking means may be used to securely lock the body to the pipe section as necessary.

Similarly, in a preferred form of the invention, the swivel section is secured to the second pipe section by welding or the like or by the use of cooperating screw threads with an appropriate lock nut or other locking means.

Preferably, the bearing members each comprise annular thrust rings with substantially parallel, radial faces which engage the respective main body, swivel section and end cap. While the first bearing member is preferably formed as a one piece thrust ring, the second bearing member may be formed as a split thrust ring to facilitate assembly of the bearing member onto a second pipe section which is welded or otherwise secured to the swivel section, particularly during maintenance and replacement of that bearing member.

Preferably, the end cap is provided with a dust seal slot in an inner cylindrical surface which is adjacent the surface of the second pipe section. An appropriate dust seal is located in the dust seal slot to minimise the ingress of foreign matter.

The bearing assembly of the present invention provides a rigid yet easily rotatable bearing structure for two pipe sections which may form the pipe work associated with a water cannon or the like. Such devices are commonly mounted on the cabins of vehicles and, as such, are subject to substantial vibration and lateral and bending forces which are concentrated at the bearing connection between the pipe sections. The bearing assembly of the present invention, incorporating the center swivel with the elongated, axially extending boss which passes through the end cap, provides the necessary rigidity and stability for a cannon system.

A further aspect of the present invention is the provision of a hydraulic water cannon kit adapted to be mounted at any appropriate location, including a vehicle cabin or other location on a vehicle, or at any fixed location. The system of the invention draws power from any electrical supply, including a vehicle electrical supply, and includes electrically driven hydraulic pumps to supply hydraulic motors which control the system, including rotation of the pipe work.

The water cannon, or similar equipment, is supplied with water from a storage system using pumps to develop the necessary head. Two bearing assemblies are incorporated into the water cannon pipe system whereby the water cannon nozzle is able to be moved in both the horizontal and vertical planes. Hydraulic motors are associated with each bearing whereby the appropriate pipe section is able to be rotated relative to its associated section to produce the necessary movement of the nozzle. Alternatively, hydraulic cylinders may be used in place of hydraulic motors where the angle of movement is limited.

An electric joy stick control is provided at an appropriate location, such as in a vehicle cabin, whereby movement of the water cannon nozzle is able to be controlled in a known manner.

In order that the invention is more readily understood, embodiments will now be described with reference to the accompanying drawings.

DESCRIPTION OF THE PREFERRED EMBODIMENT

Figure 1:
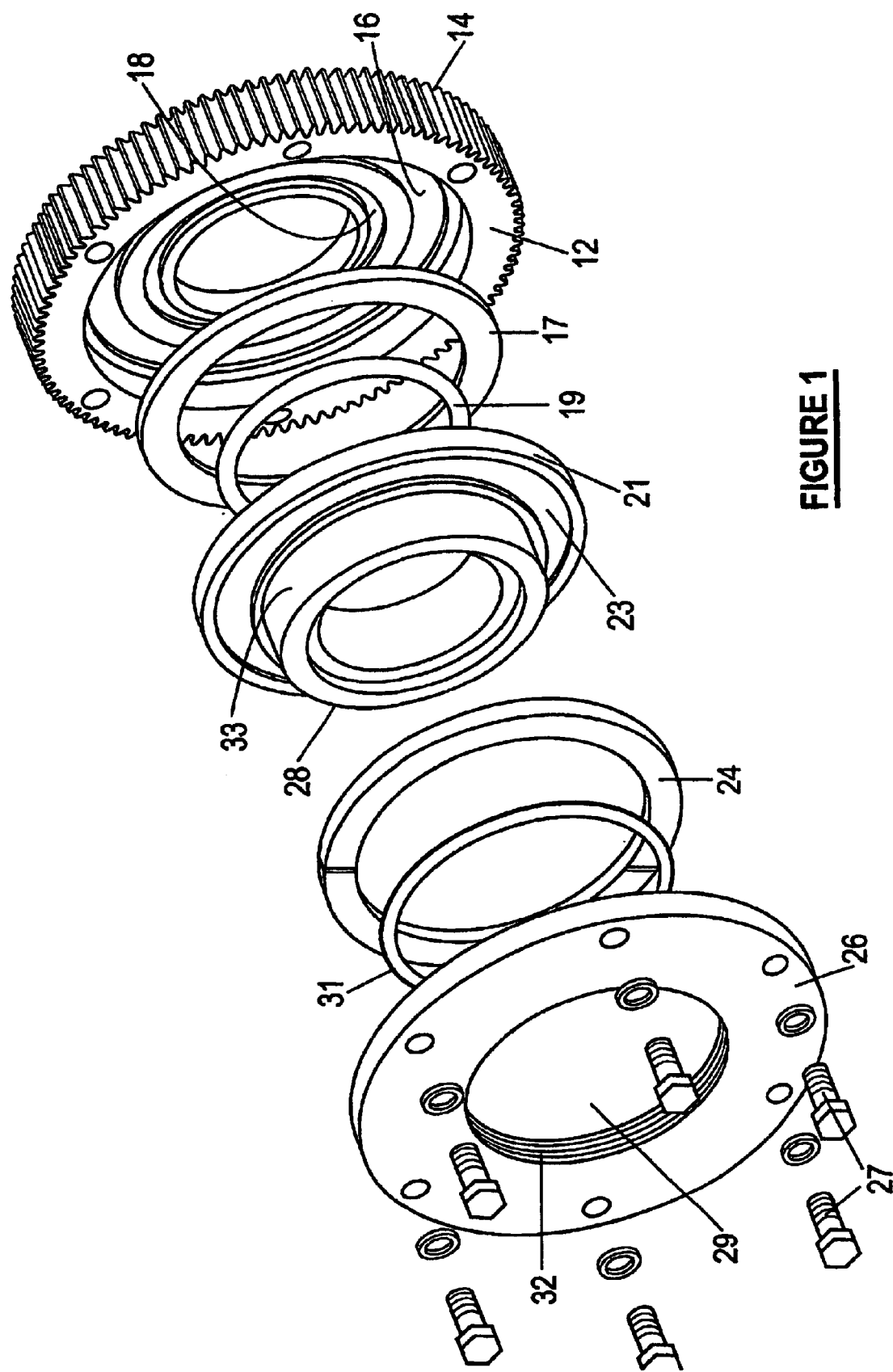
FIG. 1 is an exploded perspective view of one embodiment of a bearing assembly in accordance with the invention.
Figure 2:
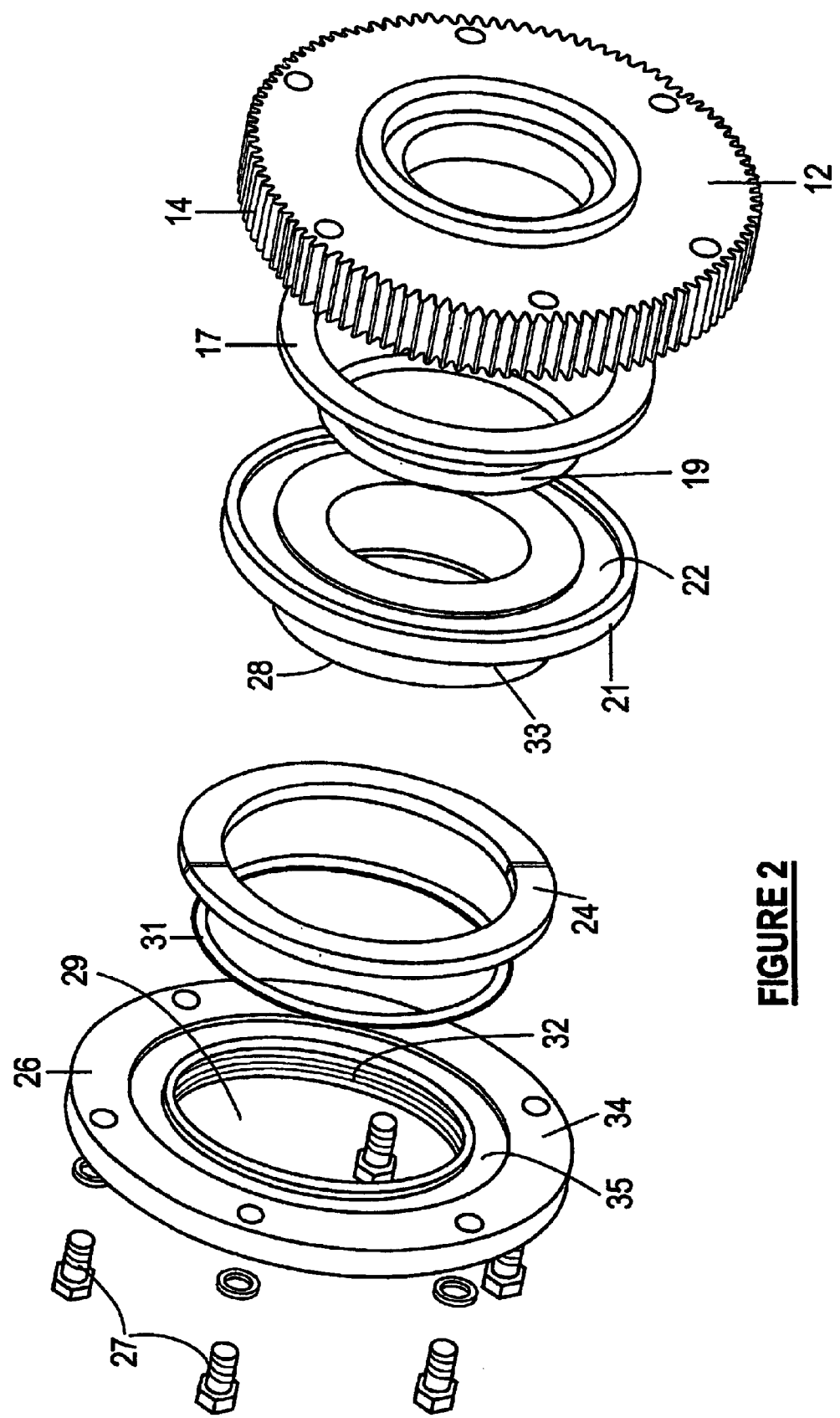
FIG. 2 is an exploded perspective view of the bearing assembly of FIG. 1 taken from the opposite direction.

Referring to FIGS. 1 and 2 of the drawings, a bearing assembly for relatively moveable pipe sections in a fluid supply system, such as in a water cannon or similar apparatus, has a main body 12 which is adapted to be connected, as by welding, to one end of one of the pipe sections. It will be appreciated that the main body 12 may be secured to the pipe section by a screw thread, adhesive or any other suitable connecting means.

The body 12 is formed on its outer surface with gear teeth 14 by which the body 12 and the connected pipe section is able to be rotated about its axis.

The body 12 is formed on an inner radial face with a coaxial seat 16 which is adapted to receive a first annular bearing member 17. A coaxial groove 18 is also formed on the radial surface of the body 12, the groove 18 being adapted to receive an O-ring seal 19.

The bearing assembly includes a center swivel section 21 which is adapted to be secured to one end of a second relatively moveable pipe section. Again, the center section maybe secured to the pipe section by welding, a screw thread, adhesive or any other suitable connection means.

The center swivel is provided on a first radial face with a coaxial seat 22 to engage with the first bearing member 17. A similar coaxial seat 23 is formed on an opposed radial face of the swivel section 21 to receive a second annular bearing member 24. A bearing end cap 26 is mounted coaxially with the center swivel section 21 and main body 12, and is secured to the body 12 by bolts 27 or similar securing means. The bearing end cap 26 is formed on a radial face 34 with a coaxial seat 35 which, in use, engages with the annular bearing member 24.

The swivel section 21 is formed with an axially extending boss 28 which engages through a coaxial, circular opening 29 in the end cap 26. A dust seal O-ring 31 located in a circular groove 32 in the end cap 26 seals against the outer cylindrical surface 33 of the boss 28.

The first and second bearing members 17 and 24 are formed of a bearing material such as phosphor bronze, but more preferably of a material known under the Trade Mark VESCONITE. The bearing members 17 and 24 act as thrust rings for the bearing assembly and permit relative rotational movement between the center swivel section 21 and the main body 12 and connected end cap 26. The structure of the swivel section 21 with the integral boss 28 provides a substantially rigid swivel section which resists deformation in use and provides stability to the bearing assembly, particularly when the assembly is used in environments subject to severe vibration and lateral forces applied to the respective pipe sections.

The second bearing member 24 is preferably formed as a split thrust ring to facilitate replacement without the need to disassemble the pipe section normally connected to the center swivel section 21.

Figure 3:
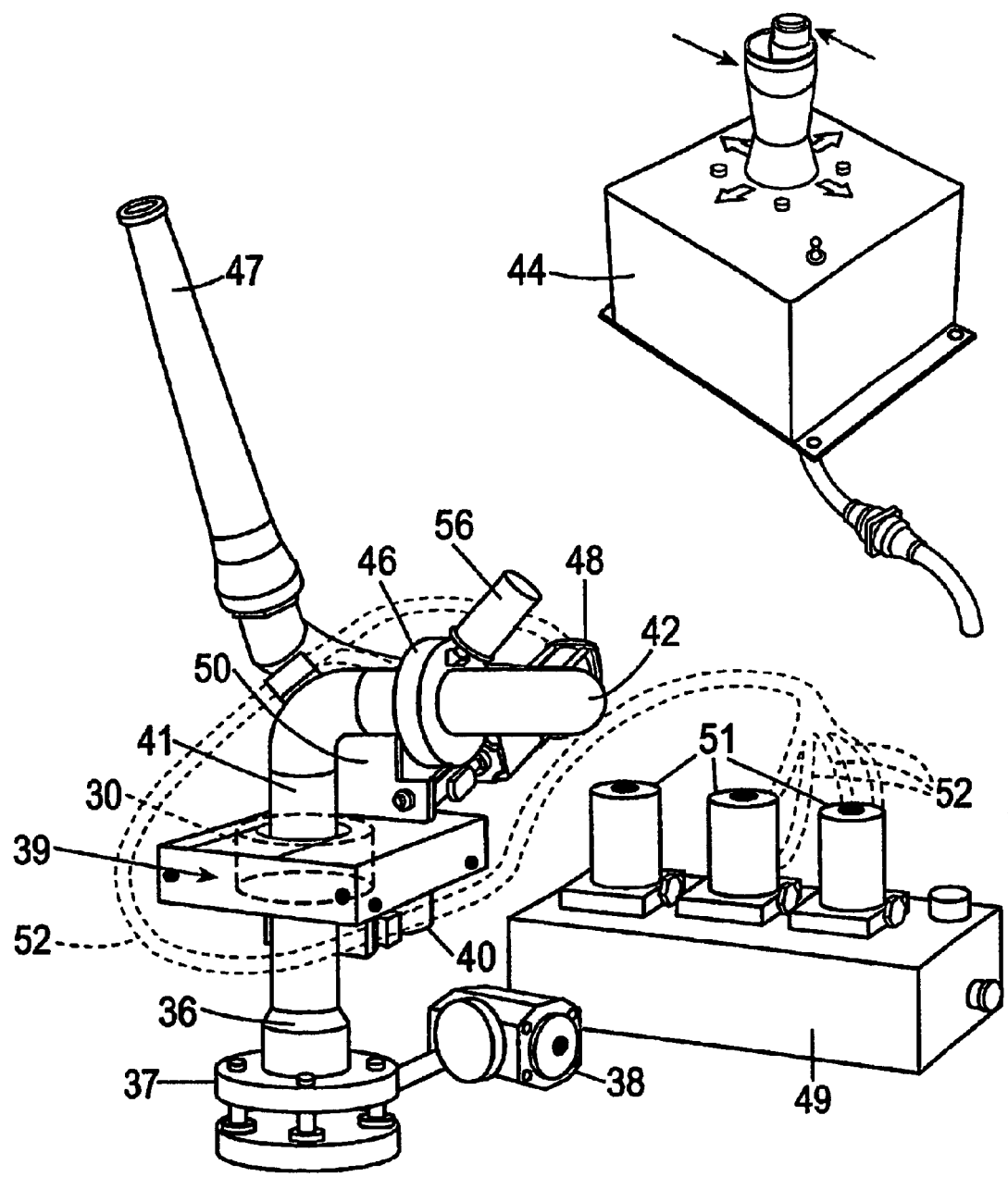
FIG. 3 is a schematic illustration of a water cannon system in accordance with an embodiment of the invention.

Referring to FIG. 3 there is schematically illustrated a water cannon utilising bearing assemblies of FIGS. 1 and 2. The water cannot is adapted to be mounted, for example on the roof cabin of a vehicle or at any other suitable location for use as firefighting equipment, dust laying apparatus, agricultural purposes or the like. The water cannon includes a first, substantially vertical pipe section 36 which is adapted to receive water from an appropriate storage by means of pumps (not shown). At the base of the water cannon is a butterfly control valve 37 with pneumatic or hydraulic actuator 38. A housing 39 mounted on the pipe section 36 surrounds a first bearing assembly 30 and a pinion drive (not shown) on a hydraulic motor 40. The pinion on the hydraulic motor 40 engages with the drive teeth 14 on the body of the first bearing assembly 30. With the arrangement illustrated, the body 12 of the bearing assembly 30 is secured to the second pipe section 41 while the hydraulic motor 40 and housing 39 are connected to the vertically extending, first pipe section 36. Operation of the hydraulic motor 40 thereby causes the body 12 (incorporating the drive gear teeth 14) and attached second pipe section 41 and attached components to be able to rotate about the axis of the first pipe section 36 in a 360° arc limited only by the arrangement of connecting hydraulic lines 52.

A second bearing assembly 46 (without gear teeth 14) is mounted on a substantially horizontally extending part of the second pipe section 41 and connects this to a third pipe section 42 reversely turned and leading to the water cannon nozzle 47. The second bearing assembly 46 is disposed between the second and third pipe sections 41 and 42 to facilitate relative rotational movement therebetween whereby the water cannon is able to be moved in a vertical plane. A hydraulic cylinder 48 is connected between a plate 50 attached to the second pipe section 41 and the third pipe section 42 whereby the third pipe section 42 and associated nozzle 47 is able to rotate about the horizontal axis through the bearing assembly 46 in an arc of up to 270°, depending on the desired function of the cannon 47. A 360° movement may be provided if necessary for any particular application.

The bearing assemblies 30 and 46 are each provided with automatic lubrication systems which comprise lubrication injectors 56 mounted on either the bearing end cap 26 or the main body 12. The lubrication injectors 56 (one of which is shown in FIG. 3) provide an automatic, periodic injection of lubricant into the bearing assembly to lubricate the respective bearing members. Such lubrication injectors 56 may be manually actuated or actuated automatically by a timer.

In the structure illustrated in FIG. 3, the water cannon may be controlled by an electric joy stick control 44 mounted in a vehicle cabin or at any other location. While water cannon of this type are commonly connected to the hydraulic systems of a motor vehicle, this arrangement may be relatively expensive in terms of service, down time to the vehicle during maintenance of the cannon, potential contamination to the vehicle hydraulic system oil and the requirement that the vehicle operating systems be functioning to enable the water cannon to operate. It is therefore a feature of the embodiment described that the water cannon system is self contained and requires only vehicle electrical power to operate the cannon. For this purpose, a hydraulic "power pack" 49 comprises at least one, preferably several electric motors 51 which drive one or more hydraulic pumps located within the housing of the power pack 49. The hydraulic pumps provide hydraulic fluid via the hydraulic lines 52 to the hydraulic motor 40, the hydraulic cylinder 48, and possibly the control valve actuator 38, although the actuator may be controlled by vehicle pneumatics or electrics.

By providing the control system for the water cannon as a kit, the system can be retrofitted to any vehicle without the need for using vehicle hydraulic systems or vehicle pneumatic systems. This system is therefore able to be moved from vehicle to vehicle if required and may be easily maintained with minimal vehicle down time.

What is claimed is:

1. A bearing assembly for relatively moveable pipe sections in a fluid delivery system, said assembly comprising a main body connectable to one end of one pipe section, the main body having in a generally radially extending annular face, a coaxial seat, to receive a first, generally annular bearing member, and defining a coaxial groove to receive an annular seal member, an annular center swivel section connectable to one end of a second pipe section and having on one generally radially extending face, a coaxial seat to engage said first bearing member and having a second coaxial seat on an opposed generally radially extending face to receive a second annular bearing member, said swivel section including an annular, axially extending boss extending away from said main body with the opposed generally radially extending face extending radially outwardly from said boss, and a bearing end cap engageable around said second pipe section and be fastened to said main body sandwiching said swivel section and bearing members, said end cap having a seat for said second bearing member, and a second seal member disposed between said end cap and said swivel section.

2. A bearing assembly according to claim 1 wherein the center swivel boss extends through an opening in the end cap and is closely spaced therefrom.

3. A bearing assembly according to claim 1 wherein the boss provides means for the securement of the second pipe section to the swivel section.

4. A bearing assembly according to claim 1 wherein the main body has gear teeth formed on an outer cylindrical surface by which the body is rotatable about an axis of the bearing relative to the swivel section.

5. A bearing assembly according to claim 1 wherein the end cap is secured to the main body by means of axially extending bolts.

6. A bearing assembly according to claim 1 wherein the main body is secured to the first pipe section by one of welding and cooperating screw threads formed in the main body and on the end of the first pipe section.

7. A bearing assembly according to claim 1 wherein the boss of the swivel section is secured to the second pipe section by one of welding and cooperating screw threads.

8. A bearing assembly according to claim 1 wherein the bearing members each comprise annular thrust rings with substantially parallel, radial faces which engage with the respective seats in the respective main body, swivel section and end cap.

9. A bearing assembly according to claim 1 wherein the second bearing member is formed as a split thrust ring to facilitate assembly of the bearing member onto the second pipe section.

10. A bearing assembly according to claim 1 wherein the end cap is provided with a dust seal slot in an inner cylindrical surface adjacent the surface of the boss, and a dust seal is located in the dust seal slot to minimize the ingress of foreign matter.

11. A bearing assembly according to claim 1 including means for lubricating the bearing members within the assembly.

12. A hydraulic water cannon comprising a first water inlet pipe connectable to a water supply, a first bearing assembly according to claim 1 having the boss of the swivel section connected to the inlet pipe, a second pipe section connected to the main body of the bearing assembly, the second pipe section having a right angle elbow, a second bearing assembly having the boss of the swivel section connected to the second pipe section, a third pipe section connected to the main body of the second bearing assembly and having a reversely turned elbow to which an angled water outlet nozzle is connected, the first bearing assembly having a hydraulic actuator to move the main body relative to the inlet pipe, a second hydraulic actuator to move the main body of the second bearing assembly relative to the second pipe section, and a hydraulic fluid delivery system including at least one electrically driven hydraulic pump connected to the hydraulic actuators.

13. A hydraulic water cannon according to claim 12 wherein relative movement of the bearing assemblies and the nozzle is effected by a joy stick control activating individual actuators.

14. A hydraulic water cannon according to claim 12 wherein the hydraulic actuators comprise at least one of hydraulic motors and cylinders.

15. A hydraulic water cannon according to claim 12 wherein a control valve is mounted in the first pipe section.

* * * * *